United States Patent

[11] 3,544,712

[72] Inventors Lester R. Adams
Saratoga;
Kenneth G. Beaman, Sunnyvale; Louis E. Handloff; Theodore P. Harley; John F. Kevill, San Jose, California

[21] Appl. No. 672,873
[22] Filed Oct. 4, 1967
[45] Patented Dec. 1, 1970
[73] Assignee International Business Machines Corporation
Armonk, New York
a corporation of New York

[54] MULTIPLEXED DIGITAL FLYBACK CONTROL OF CRT DISPLAYS
7 Claims, 10 Drawing Figs.

[52] U.S. Cl. .......... 178/6.8, 178/6.5
[51] Int. Cl. .......... H04n 3/16
[50] Field of Search .......... 178/6.8, 6(PD), 6(IND), 6.5, 7.7; 315/18—31(Inquired)

[56] References Cited

UNITED STATES PATENTS

| | | | |
|---|---|---|---|
| 3,453,384 | 7/1969 | Donner et al. .......... | 178/6.8 |
| 3,472,951 | 10/1969 | Shimaoa et al. .......... | 178/6.8 |

FOREIGN PATENTS

| | | | |
|---|---|---|---|
| 763,193 | 12/1956 | Great Britain .......... | |

*Primary Examiner*—Robert L. Griffin
*Assistant Examiner*—Richard K. Eckert, Jr.
*Attorneys*—Hanifin and Jancin, Peter R. Leal and John H. Holcombe

ABSTRACT: Means to effect absolute control of a multiplicity of cathode-ray tube (CRT) display units from external storage, by using information recorded on said external storage as a system oscillator; means being provided at each CRT display unit to utilize said recorded information to operate horizontal and vertical flyback and simultaneously block CRT display data; said means allowing the use of a common horizontal flyback line from said external storage for synchronizing all CRT's and a simplex data line from said external storage to each CRT for providing video data and vertical flyback.

INVENTORS.
LESTER R. ADAMS
KENNETH G. BEAMAN
LOUIS E. HANDLOFF
THEODORE P. HARLEY
JOHN F. KEVILL

BY Peter R. Leal
Agent

MULTIPLEXED DIGITAL FLYBACK CONTROL OF CRT DISPLAYS

BACKGROUND OF THE INVENTION

The invention relates to a scheme for providing timing control from an external storage device for a multiplicity of cathode-ray tube (CRT) display units, including means for providing common horizontal flyback control for all CRT units and means for updating and continuously regenerating visible data and supplying vertical flyback control to each of said units on an individual basis.

Cathode-ray tube display systems in the prior art have suffered from the drawback of requiring expensive stable oscillators, synch mixers, and synch separaters to provide synchronization for each of the display units in the system. Such prior art systems have required means to independently control horizontal and vertical flyback of each of the multiplicity of display units in the system. Synchronization oscillator requirements in such prior art systems are critical, and drift causes undesirable disturbances and instabilities in operation. Consequently, such critical synchronization requirements have let to the use of expensive stable oscillators, as well as synch mixers and synch separaters for each display unit in the system.

SUMMARY OF THE INVENTION

The present invention has overcome the problems of the prior art by providing digital control from an external storage device and control unit to operate horizontal and vertical flyback and simultaneously block CRT display data having the external storage device as its source. The invention provides digital control pulses for horizontal flyback (HFB) and vertical flyback (VFB) individually to each CRT display unit, using only a single data line to each CRT unit for visible data and VFB control, a single shared HFB line, and minimal digital logic circuitry.

Advantageously, control of each CRT unit is restricted to update only, releasing the control unit to perform other functions, and collaterally allowing a controller of given capability to service a greater number of displays. Line sharing reduces cabling and driver costs. Digital control results in more precise and stable synchronization than conventional television practice, eliminating the need for critically stable oscillators, synch mixers, and synch separaters for both HFB and VFB. Further, because of its inherent exactness of pulse phase and duration, digital control tolerates simpler and less critical CRT unit sweep circuits than used in conventional television practice, and also permits a greater portion of display time and data storage capacity to be devoted to useful data.

It is therefore an object of this invention to inexpensively provide improved stable synchronization for a multiplicity of CRT display units.

It is another object of this invention to inexpensively operate the horizontal and vertical flyback of each of a multiplicity of display units in a system and simultaneously block CRT display data, in an improved stable manner.

It is a further object of this invention to control the horizontal flyback, vertical flyback, and visual data updating of each of the cathode-ray tube display units in a system in an enhanced manner without the necessity of expensive oscillators, synch mixers, and synch separaters.

It is a more specific object of this invention to economically provide digital control pulses from an external storage device to control horizontal flyback, vertical flyback and display data individually to each of a multiplicity of units, given only a single individual data line to each display unit, a single horizontal flyback line shared by each display unit, and minimal control logic.

Briefly, the invention comprises updating visible data to a multiplicity of CRT display units on an individual basis, as well as providing horizontal flyback (HFB) and vertical flyback (VFB) control to said units, from information stored on an external storage device such as a rotating surface of a disk storage drive. A disk storage is used for illustrative purposes only. Any of the recirculating-type storage devices could as easily be used, such as, for example, a tape loop, recycling core storage, or circulating delay line, to name a few. The surfaces of the disk storage drive have information written thereon in parallel tracks. One of said tracks on a surface comprises a timing track wherein timing pulses are precisely written in a discrete manner such as, for instance, double frequency recording. This timing information is read from the disk surface over a single line to be used as horizontal flyback control for each of said display units. Information is precisely written on each of the other parallel tracks in a discrete manner such as for instance, by the type of magnetized recording known as the NRZI (nonreturn to zero) system. Such a system is shown in U.S. Pat. No. 2,774,646, entitled "Magnetic Recording Method", which issued on Dec. 18, 1956, and is assigned to the same assignee as the present invention. This latter information is read from each individual track and applied over individual or simplex data lines (hereinafter referred to as data lines), one for each display unit, to provide visible data updating information and vertical flyback control for each display unit on an individual basis. Digital control logic is provided for each display unit, which logic analyzes the data line under control of the common horizontal flyback line (hereinafter referred to as multiplex HFB line) and in turn steers the data line information to either the vertical flyback input of the display unit for providing vertical flyback control, or to the visible data input of the cathode-ray tube for providing visible data updating.

The foregoing and other objects, features and advantages of the invention will be apparent from the following more particular description of a preferred embodiment of the invention, as illustrated in the accompanying drawings.

DETAILED DESCRIPTION

Figure 1:
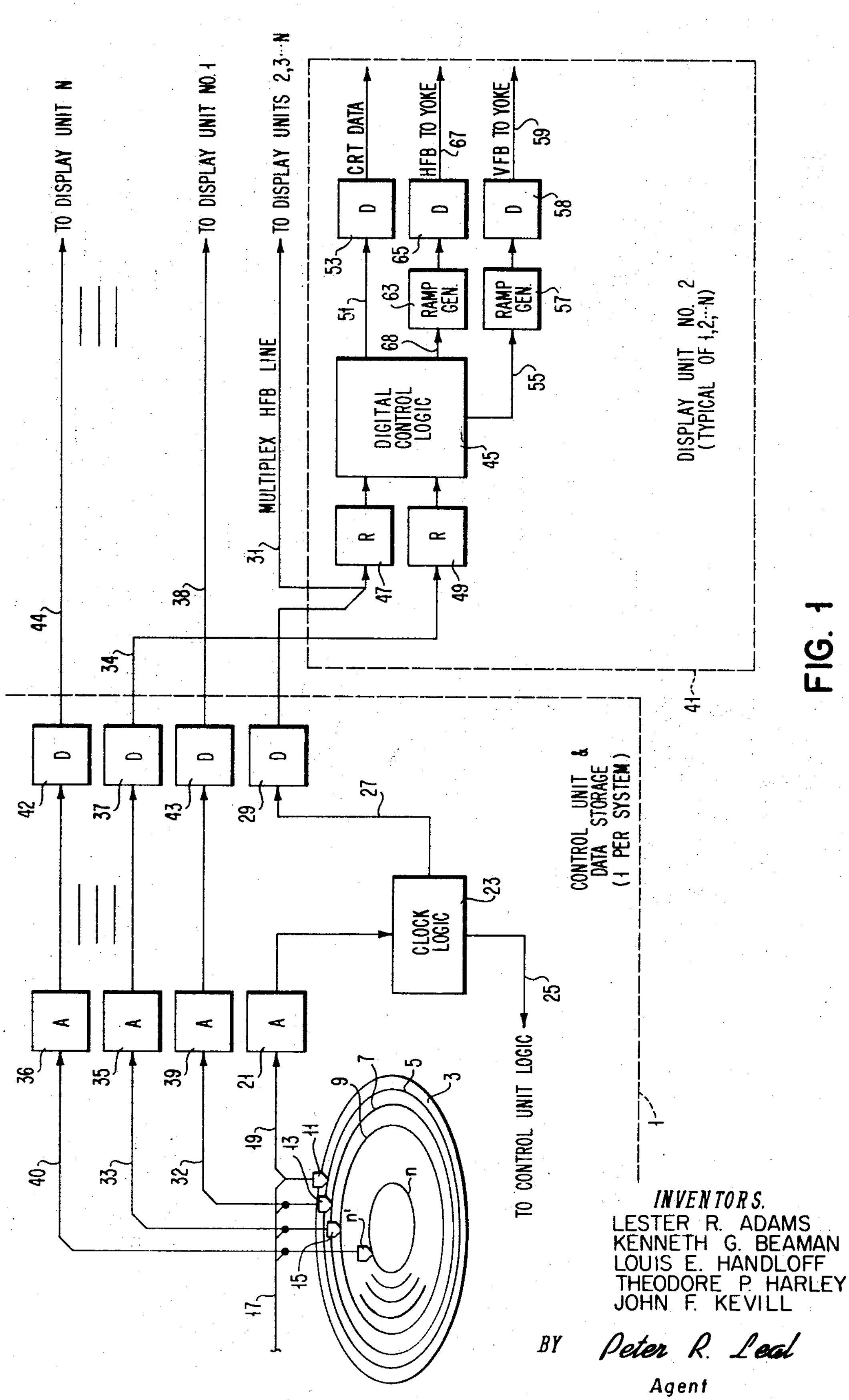
FIG. 1 is a general overall block diagram of the invention showing data flow between the external storage device and each of a multiplicity of display units.

Turning now to FIG. 1 there is shown a control unit indicated generally at 1, which may be, for instance, an IBM 2314 Control Unit with a 1501 Video Disk Buffer. Said control unit contains at least one disk buffer surface indicated generally at 3. On said surface is recorded information in parallel data tracks such as 5, 7, 9, ... *n*. Each data track has associated therewith a read-write head 11, 13, 15, ... *n'*. Information is written onto said data tracks over buss 17 by control circuitry, not forming a part of this invention. One of said parallel data tracks, such as 5, is used as a timing track in which discrete timing bits are precisely written in a well-known manner such as, for example, double frequency recording. The timing bits from timing track 5 will be continuously read during system operation over line 19 via read amplifier 21 to be detected by clock logic 23 in a well-known manner. From said timing bits, clock logic 23 develops timing pulses which will be supplied via line 25 to the control unit logic circuitry, not forming a part of this invention. These clock pulses are also supplied via line 27, line driver 29, and line 31 as horizontal flyback control to each display unit. Line 31 will be hereinafter referred to as the common HFB line.

The other tracks 7, 9, ... *n*, are data tracks and each contains information recorded in a well known manner such as, for example, NRZI. There may be, for purposes of illustration, one data track for each display unit. The information on each of these data tracks corresponds to visible data as well as vertical flyback control information. This information will be supplied from the data track on the disk surface to each display unit.

For instance, the information on data track 9 will be read-write head 15, utilizing well-known control techniques, over line 33 via read amplifier 35 and line driver 37 and via line 34 to an individual CRT unit such as a typical one shown schematically at 41. Each line such as 34 will be hereinafter referred to as a data line. Each data line is a simplex line, that is, there is an individual data line for each CRT unit. For instance, the information on data track 7 can be read via read-write head 13 over line 32 via read amplifier 39 and line driver 43 to supply information over data line 38 to a second CRT display unit. This configuration may be repeated for each of N display units.

Figure 3:
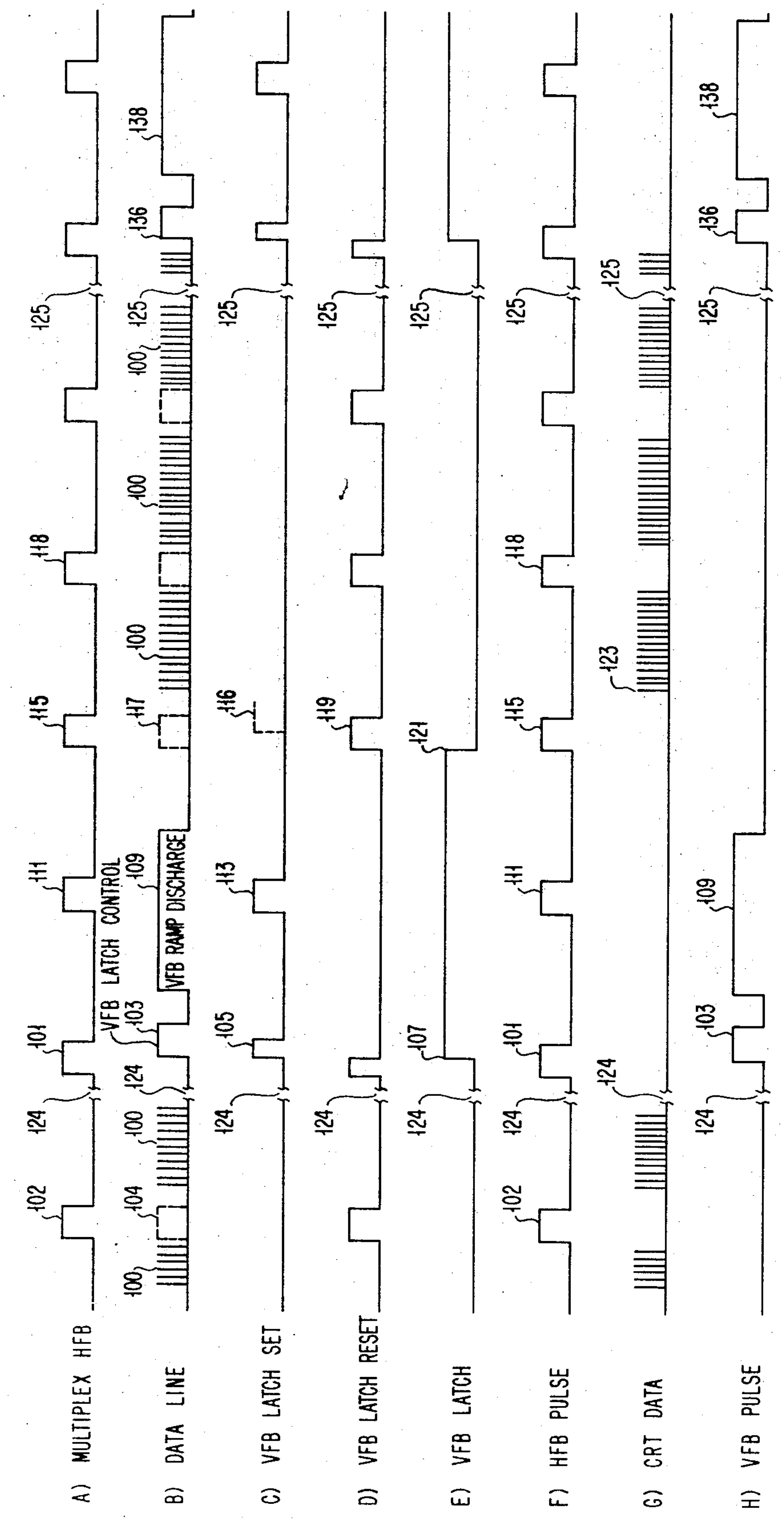
FIG. 3A–3H show the various wave shapes developed in the operation of the invention.

At this point attention is directed to FIG. 3A and FIG. 3B to indicate the configuration of the data recorded on tracks 5, 7, 9, ... *n*. FIG. 3A illustrates the HFB pulses on common HFB line 31 after detection by clock logic 23. From this FIG. it can be seen that the timing bits on clock track 5 are recorded in a substantially equally spaced configuration, the time between leading edges being substantially the time between successive horizontal flyback instants of the horizontal ramp generator, hereinafter described. FIG. 3B indicates the configuration of information recorded on data tracks 7, 9, ... *n*. As can be seen, bits 100 representing visible data are written in "sectors" occurring between bits on timing track 5. That is, relative to an index point, at times when there is a timing signal recorded on track 5 there are no bits representing visible data recorded on tracks 7, 9, ... *n*, and vice versa. The general theory relative to the recording of visible data in binary form may be seen in the publication entitled "Binary to Video Converter" By L. E. Handloff, IBM Technical Disclosure Bulletin, Vol. 9, No. 11, April 1967, at pp. 1544–4. As can also be seen from FIG. 3B, the information on the data tracks also includes VFB signals, the detailed function of which will be hereinafter described. The number of recorded VFB signals per frame of display is a function of the regeneration rate of the particular CRT used. The present embodiment assumes a regeneration rate requiring interlacing of two fields per frame, with the result that there are two recorded VFB signals per frame.

The invention could as easily utilize CRT's with regeneration rates not requiring interlacing, with the result that there would be only one VFB signal per frame. It will be recognized by those skilled in the art that the invention is not limited to either of the above configurations. In general there can be any number of recorded VFB signals per frame, dependent upon CRT regeneration rate, without departing from the spirit and scope of the invention.

Referring again to FIG. 1, typical CRT display unit 41 indicates the general configuration for each display unit. Common HFB line 31 is supplied to digital control logic 45 in display unit 41 via line receiver 47, as well as to the digital control logic contained in each of the other display units of the system in like manner. Data line 34 is also connected to digital control logic 45 of display unit 41 via line receiver 49. Likewise, the individual data line for each display unit is connected to the digital control logic of its respective display unit. As will be hereinafter described in more detail, circuitry within digital control logic 45 analyzes incoming information over data line 34 under control of the timing pulses on common HFB line 31 and in turn steers visible data on the data line to the visible data input of the CRT via line 51 and data driver 53 or alternatively blanks said data and steers VFB ramp discharge control to the VFB ramp generator 57 via line 55. Vertical ramp generator 57 will generate a vertical sweep voltage via line driver 58 to the yoke of the cathode-ray tube via line 59, and said ramp generator will be discharged by VFB Ramp Discharge Pulse 109 of FIG. 3B as will hereinafter be explained. Horizontal ramp generator 63 will develop a properly timed horizontal sweep voltage and will deliver same to the yoke of the cathode-ray tube via line driver 65 and line 67. Said horizontal ramp generator will be periodically discharged by the HFB pulses of FIG. 3A via line 68 as will hereinafter be explained. The above explained structure is typical of each display unit in the system. The general theory of horizontal and vertical synchronization is well known and can be seen in Terman, Electronic and Radio Engineering, McGraw-Hill Book Co., Fifth Edition, at pages 649 and 977 et seq.

Figure 2:
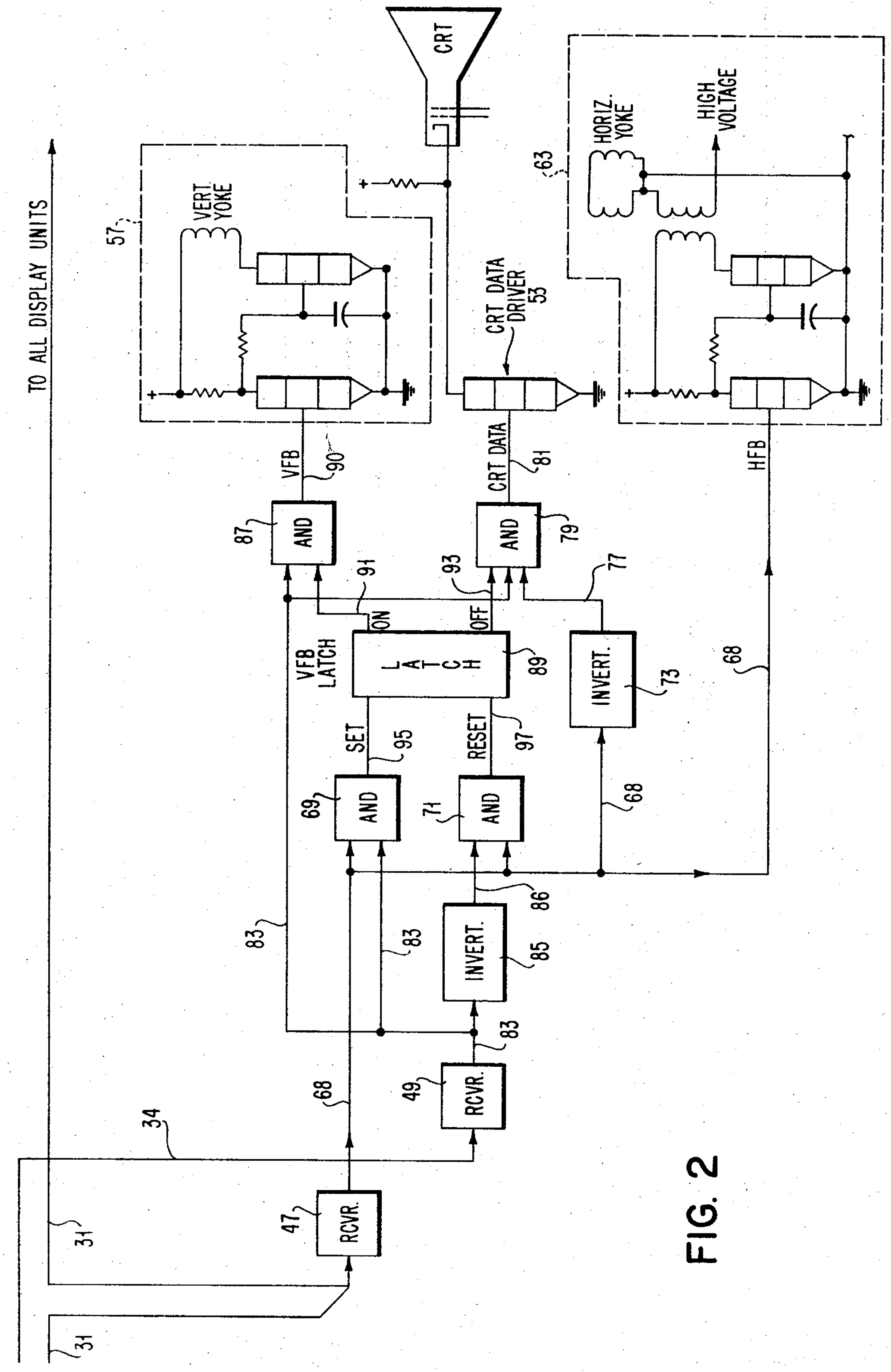
FIG. 2 shows typical digital control logic in each CRT display unit.

Turning now to FIG. 2, there is seen the circuitry included in digital control logic 45 of FIG. 1. It will be recalled from FIG. 1 that data line 34 is connected to digital control logic 45 via line receiver 49, and that common HFB line 31 is connected to digital control logic 45 via line receiver 47. Line receiver 47 which will receive timing pulses from common HFB line 31 is connected to AND gates 69 and 71 and to invert block 73 via line 68. Line 68 also connects line receiver 47 directly with horizontal ramp generator 63 to enable horizontal flyback timing pulses to periodically discharge horizontal ramp generator 63 in a manner illustratively explained in the above cited text book. The output from invert block 73, which is essentially the complement of the information incoming over line 68, is applied via line 77 as a conditioning input to AND gate 79. The output of AND gate 79 will ultimately contain visible data to be written on the CRT over line 81 at other than flyback times.

Line receiver 49 receives information corresponding to visible data and VFB control information via data line 34. Line receiver 49 is connected via line 83 to inverter 85, AND gate 69, AND gate 87, and also AND gate 79. The output of AND gate 87 will ultimately be control information over line 90 for discharging vertical ramp generator 57 to effect vertical flyback.

VFB latch 89, controlled essentially by the information on data line 34 and common HFB line 31, is provided. Latch 89 acts as a conditioning means for gates 87 and 79. When set, this latch steers the information on data line 34 to VFB ramp generator 57 at a time when a VFB ramp discharge pulse such as 109 in FIG. 3B latch present to discharge said ramp generator, and concurrently blanks display data over line 81 by effecting an inhibiting condition on line 93 to AND 79. That is, VFB latch 89 is connected to AND gate 87 via line 91 for conditioning said AND gate when the VFB latch is in a set or ON condition. VFB latch is also connected to and gate 79 via line 93 to condition said AND gate when said VFB latch is in a reset of OFF condition. AND gate 69 is connected to VFB latch 89 via line 95 for setting said VFB latch, when an HFB pulse such as 101 of FIG. 3A and a VFB latch control Pulse such as 103 of FIG. 3B occur simultaneously on line 68 and 83, respectively. AND gate 71 is connected to VFB latch 89 via line 97 for resetting said VFB latch when there is an HFB pulse such as 102 of FIG. 3A present on line 68, and concurrently an absence of a pulse at a predetermined portion of the data on line 83 as seen in phantom at 104 of FIG. 3B.

OPERATION

Operation of the invention will be explained with reference to the waveforms of FIGS. 3A–3H.

FIG. 3A shows the clock timing pulses on common HFB line 31. It will be recalled that these pulses were developed by clock logic 23, from data bits read from clock timing track 5 via read head 11. This requires that the data bits on the clock timing track be recorded in spaced relationship such that when read back via read head 11, said data bits, when detected and reshaped by well-known wave shaping circuitry in clock logic 23, produce the timing pulses shown in FIG. 3A of proper repetition rate and pulse duration to periodically discharge ramp generator 63 via line 68 of FIG. 2.

FIG. 3B shows information, coming from the disk surface over a data line such as 34. The information of FIG. 3B corresponds to information which was written on a given data track, such as 9. This data includes visible data 100, a VFB latch control pulse 103, and a VFB Ramp Discharge Pulse 109. Necessary timing information for writing visible data, VFB latch Control, and VFB Ramp Discharge data can be derived from timing track 5 on the disk surface. By interpreting location signals derived from the timing track 5, the control unit is able to place said data on said data tracks in their proper relationship on the disk by well-known recording means which will not be discussed further here.

As data is read from timing track 5, HFB pulses, used to discharge HFB ramp generator 63 are developed directly from the timing track via clock logic 23. Concurrently with reading of timing information from timing track 5, information is read from the data tracks for each of the other display units. For instance, data is concurrently read from data track 9 via head 15, read amplifier 35, line driver 37, over line 34. The combined visible data 100 and VFB synch information comprising VFB latch control pulse 103 and VFB ramp discharge pulse 109 is presented via line 34 to line receiver 49 of logic circuitry 45 for display unit 1, seen in FIG. 2. Concurrently, timing information is presented via line 31 to line receiver 47. This information proceeds over line 68 to one input of AND 69 and AND 71. The clocking information, seen as HFB pulses in FIG. 3F, also proceeds from line receiver 47 directly over line 68 to periodically discharge ramp generator 63 starting with, for example, HFB pulse 102 of FIG. 3A. At these discharge times, the complement of the HFB pulse is applied via invert block 73 to decondition AND gate 79 and insure CRT blanking during horizontal flyback. Concurrently, visible data and VFB synch information from data line 34 is proceeding to line receiver 49. As the time for discharge of the vertical ramp generator approaches, and as indicated at break 124, a portion of VFB latch control pulse 103 and HFB pulse 101 will be applied concurrently to AND gate 69 via lines 83 and 68, respectively. At that point in time, AND gate 69 will generate a VFB latch set pulse, seen at 105 in FIG. 3C over line 95 to set VFB Latch 89 to an ON condition as seen in FIG. 3E at 107. When in its ON condition, VFB latch 89 provides an enabling signal over line 91 to AND gate 87. AND gate 87 is then conditioned to allow the information on line 83 to pass via line 89. The information on line 83 at this time is VFB latch control pulse 103 and VFB ramp discharge pulse 109. VFB latch control pulse is of negligible width relative to discharging VFB ramp generator 57, said pulse 103 being only as long as necessary to set said VFB latch 89 to an ON condition. However, a long VFB ramp discharge pulse 109 follows pulse 103 and it is this pulse which passes through enabled AND gate 87 via line 89 to discharge ramp generator 57 to effect vertical flyback. Since during this time the VFB latch 89 is in its ON condition, there will be no conditioning signal to AND 79 via line 83, with the result that information on line 83 is blanked from CRT Data line 81. During the time of VFB ramp discharge HFB pulses such as 111 will occur concurrently with VFB ramp discharge pulse 109 and generate VFB latch set pulse 113 as seen in FIG. 3C. However, since VFB latch 89 is already set, VFB latch set pulse 113 will have no effect during time of VFB ramp discharge. At the conclusion of VFB ramp discharge pulse 109, a further HFB pulse 115 will arrive at AND gate 69 over line 68. However, since VFB ramp discharge pulse 109 has fallen, AND gate 69 will not produce a VFB latch set pulse at 116. Concurrently, the leading edge of pulse 115 will be presented to AND gate 79 over line 83, and the complement of data line 83 seen in phantom at 117 of FIG. 3B will be presented via invert block 85 to input 86 of AND gate 71. Thus AND gate 71 will generate VFB latch reset pulse 119 seen in FIG. 3D, which pulse via line 97 of FIG. 2 will cause VFB latch 89 to return to its OFF position as seen at point 121 on FIG. 3E and causes a conditioning signal to be transmitted to AND gate 79 via line 93 of FIG. 2. Concurrently, data line information is presented via line 83 to AND gate 79 and the complement of common HFB line information via line 68, invert block 73, and line 77, is also presented to AND gate 79. Since at this time there is an absence of information on common HFB line 31, as seen between pulses 115 and 118 of FIG. 3A, said complement of said absence of information will enable AND gate 79 via line 77 and visible data 123 of FIG. 3G will be presented to be displayed on the CRT via line 81.

As has been described, the pulses on multiplex HFB line 31, seen in FIG. 3A and again as HFB pulses in FIG. 3F, effect the periodic discharge of horizontal ramp generator 63 to provide horizontal flyback of each scanning line of the CRT unit while visible data is blanked. At the end of the first field of a given frame, the VFB ramp discharge pulse 109 of FIG. 3B likewise discharges vertical ramp generator 57 to provide vertical flyback while visible data is blanked. The process continues for the second field of a given frame, with the HFB pulses continuing to effect horizontal flyback while visible data is blanked. At the time for vertical flyback of the second field, after break 125 of FIG. 3A—FIG. 3H, VFB latch control pulse 136 and VFB ramp discharge pulse 138 operate the circuitry, as previously described for pulses 103 and 109, to discharge the vertical ramp generator to provide vertical flyback for the second field while visible data is blanked, and the process continues. The invention operates for configurations of other than two fields per frame.

The durations and repetition rates of the pulses of FIG. 3A and FIG. 3B can be advantageously designed to effect flyback at the standard television rate as described in the above-cited text. Alternatively the duration and repetition rates can be set to correspond to any synchronization rate desired, according to the designer's choice.

As can be seen, the need for multiple critical oscillators is eliminated. The recorded timing pulses on timing track 5, and the recorded vertical synchronization information on the data tracks effectively set system synchronization. The recording of this information can be controlled very precisely by using known recording techniques. Additionally, if the speed of the mechanical drive of the external storage device changes, the synchronization rate of the system changes accordingly, thus eliminating undesirable disturbances and instabilities in operation such as loss of synchronization with attendant jitter, jump, and roll, inter alia. Further, expensive synch mixers and synch separators have been eliminated.

While the invention has been particularly shown and described with reference to a preferred embodiment thereof, it will be understood by those skilled in the art that various changes in form and details man be made therein without departing from the spirit and scope of the invention.

We claim:

1. Apparatus for providing a plurality of video information displays comprising:
   - a plurality of raster-scan video display devices, including sweep circuitry having a driven horizontal flyback and a driven vertical flyback;
   - external storage means;
   - a string of horizontal flyback timing signals recorded on said external storage means;
   - a plurality of individual strings of data, including video information and vertical flyback timing signals, recorded on said external storage means in synchronism with said horizontal flyback signals;
   - detection means for detecting said horizontal flyback signals and producing therefrom horizontal flyback pulses;
   - transmission means for transmitting said horizontal flyback pulses to each of said video display devices for driving the horizontal flyback data; and each display simultaneously;
   - additional transmission means for transmitting to each of said video display devices a specified one of said individual strings of data;
   - logic means for each video display device responsive to said horizontal flyback pulses and to said specified one of said individual strings of data and producing signals for displaying said video information on said video display device, for driving said vertical flyback, and for inhibiting the display of said video information when said horizontal flyback or said vertical flyback is being driven.

2. Apparatus for providing a plurality of video information displays comprising:

- a plurality of raster-scan video display devices including sweep circuitry having a driven horizontal flyback and a driven vertical flyback;
- external storage means;
- a string of horizontal flyback signals recorded on said external storage means;
- a plurality of data strings recorded on said external storage means in synchronism with said horizontal flyback signals, said data strings including video information and vertical flyback signals;
- transmission means supplying said horizontal flyback signals to each of said video display devices for driving said horizontal flyback in each display device simultaneously;
- additional transmission means for transmitting, in synchronism with said horizontal flyback signals, an individual one of said data strings to an individual one of said display devices;
- logic means for each of said video display devices responsive to said string of horizontal flyback signals and to said individual one of said data strings; and
- said logic means including a vertical flyback gate for gating said vertical flyback signals to drive said vertical flyback, and a data gate for gating said video information to said display device at times when said horizontal flyback and said vertical flyback are not being driven.

3. Apparatus for providing a plurality of video information displays comprising:

- a plurality of raster-scan video display devices including sweep circuitry having a driven horizontal flyback and a driven vertical flyback;
- external storage means;
- a string of horizontal flyback signals recorded on said external storage means;
- a plurality of data strings recorded on said external storage means in synchronism with said horizontal flyback signals, said data strings including video information and vertical flyback signals;
- transmission means supplying said horizontal flyback signals to each of said video display devices for driving said horizontal flyback in each display device simultaneously;
- additional transmission means for transmitting, in synchronism with said horizontal flyback signals, an individual one of said data strings to an individual one of said display devices; and
- logic means for each of said video display devices responsive to said string of horizontal flyback signals and to said individual one of said data strings; said logic means including:
- a vertical flyback gate for gating said vertical flyback signals to drive said vertical flyback, and a data gate for gating said video information to said display device at times when said horizontal flyback and said vertical flyback are not being driven;
- first conditioning means responsive to the coincidence of a horizontal flyback signal and a vertical flyback signal and also responsive to the coincidence of a horizontal flyback signal and the complement of a predetermined portion of said individual one of said date strings;
- second conditioning means responsive to said horizontal flyback signals; and
- said first conditioning means producing signals concurrently enabling said vertical flyback gate and inhibiting said data gate, and said first and second conditioning means producing signals for concurrently inhibiting said vertical flyback gate and enabling said data gate.

4. The apparatus of claim 3 wherein said first conditioning means comprises a bistable element.

5. The apparatus of claim 3 wherein said second conditioning means comprises complementing means.

6. Apparatus for providing a plurality of video information displays comprising:

- a plurality of raster-scan video display devices having a driven horizontal flyback and a driven vertical flyback;
- a horizontal flyback clock source, said source connected to each of said display devices for driving said horizontal flyback of said video display devices simultaneously;
- a plurality of strings of data, said data including video information and vertical flyback signals;
- transmission means for transmitting in parallel said plurality of strings of data in synchronism with said horizontal flyback clock source; and
- logic means for each said video display device including gating means to gate a specified one of said strings of data to said display device, and including means responsive to a coincidence of a vertical flyback signal of said specified one of said strings of data and said horizontal flyback clock source for inhibiting said gating means and for driving the vertical flyback of said video display device.

7. The apparatus of claim 6 wherein said logic means further includes means responsive to said horizontal flyback clock source for inhibiting said gating means during times when said horizontal flyback clock source is driving said horizontal flyback.